US008527468B1

(12) United States Patent
Crafford et al.

(10) Patent No.: US 8,527,468 B1
(45) Date of Patent: Sep. 3, 2013

(54) SYSTEM AND METHOD FOR MANAGEMENT OF RETENTION PERIODS FOR CONTENT IN A COMPUTING SYSTEM

(75) Inventors: Chris Crafford, Round Rock, TX (US); Robert Gomes, Austin, TX (US); Alan Royce Brooks, Austin, TX (US); Jeffrey Mark Overton, Austin, TX (US)

(73) Assignee: Renew Data Corp., Austin, TX (US)

( * ) Notice: Subject to any disclaimer, the term of this patent is extended or adjusted under 35 U.S.C. 154(b) by 0 days.

(21) Appl. No.: 11/349,570

(22) Filed: Feb. 8, 2006

Related U.S. Application Data

(60) Provisional application No. 60/651,121, filed on Feb. 8, 2005.

(51) Int. Cl.
*G06F 17/30* (2006.01)

(52) U.S. Cl.
USPC ............................................. 707/662; 707/666

(58) Field of Classification Search
USPC ................. 707/9, 200, 2, 692, 694, 711, 662, 707/770, 654; 711/5, 170, 161; 726/30
See application file for complete search history.

(56) References Cited

U.S. PATENT DOCUMENTS

| | | | |
|---|---|---|---|
| 4,706,212 A | | 11/1987 | Toma |
| 5,107,419 A | * | 4/1992 | MacPhail ........................... 707/9 |
| 5,278,980 A | | 1/1994 | Pedersen et al. |
| 5,350,303 A | | 9/1994 | Fox et al. |
| 5,535,121 A | | 7/1996 | Roche et al. |
| 5,535,381 A | | 7/1996 | Kopper |
| 5,617,566 A | | 4/1997 | Malcolm |
| 5,644,774 A | | 7/1997 | Fukumochi et al. |
| 5,687,384 A | | 11/1997 | Nagase |
| 5,689,699 A | * | 11/1997 | Howell et al. ..................... 707/9 |
| 5,717,913 A | | 2/1998 | Driscoll |
| 5,732,265 A | | 3/1998 | Dewitt et al. |
| 5,742,807 A | | 4/1998 | Masinter |
| 5,778,395 A | * | 7/1998 | Whiting et al. ............... 707/204 |

(Continued)

FOREIGN PATENT DOCUMENTS

| | | |
|---|---|---|
| EP | 1967972 | 9/2008 |
| JP | 2003303194 | 10/2003 |

(Continued)

OTHER PUBLICATIONS

Cohen, E. et al.; "Processing Top k Queries from Samples"; ACM.

(Continued)

*Primary Examiner* — Sherief Badawi
(74) *Attorney, Agent, or Firm* — Berry & Associates P.C.

(57) ABSTRACT

Disclosed are embodiments of a system and method for establishing and managing document retention policy in a distributed computing environment. One embodiment comprises the steps of loading documents into a database as individual components or items; establishing a custodian for each document instance; categorizing its content into a plurality of categories; assigning retention periods to the content by category; and continuously monitoring retention policies according to the assigned retention periods. Any database capable of storing de-duplicated data can be adapted to implement embodiments of the invention. One embodiment utilizes codified algorithms to cross-match one or more retention policies with each document instance in the system based on the role of the custodian held at the time the instance was created and retained and/or the content or category of the content to which the document refers. If multiple policies apply, the retention period is set to the furthest in the future.

12 Claims, 9 Drawing Sheets

(56) References Cited

U.S. PATENT DOCUMENTS

| | | | |
|---|---|---|---|
| 5,813,009 A | 9/1998 | Johnson et al. | |
| 5,813,015 A * | 9/1998 | Pascoe | 707/200 |
| 5,926,811 A | 7/1999 | Miller et al. | |
| 5,937,401 A * | 8/1999 | Hillegas | 707/2 |
| 5,982,370 A | 11/1999 | Kamper | |
| 6,006,221 A | 12/1999 | Liddy et al. | |
| 6,023,710 A | 2/2000 | Steiner et al. | |
| 6,047,294 A | 4/2000 | Deshayes et al. | |
| 6,125,371 A * | 9/2000 | Bohannon et al. | 707/695 |
| 6,157,931 A | 12/2000 | Cane et al. | |
| 6,182,029 B1 | 1/2001 | Friedman | |
| 6,189,002 B1 | 2/2001 | Roitblat | |
| 6,199,067 B1 | 3/2001 | Geller | |
| 6,199,081 B1 | 3/2001 | Meyerzon et al. | |
| 6,216,123 B1 | 4/2001 | Robertson et al. | |
| 6,226,630 B1 | 5/2001 | Billmers | |
| 6,226,759 B1 | 5/2001 | Miller et al. | |
| 6,240,409 B1 | 5/2001 | Aiken | |
| 6,243,713 B1 | 6/2001 | Nelson et al. | 1/1 |
| 6,256,633 B1 | 7/2001 | Dharap | |
| 6,269,382 B1 | 7/2001 | Cabrera et al. | |
| 6,278,992 B1 | 8/2001 | Curtis et al. | |
| 6,324,548 B1 | 11/2001 | Sorenson | |
| 6,389,403 B1 | 5/2002 | Dorak, Jr. | |
| 6,393,389 B1 | 5/2002 | Chanod et al. | |
| 6,408,266 B1 | 6/2002 | Oon | |
| 6,421,767 B1 | 7/2002 | Milillo et al. | |
| 6,453,280 B1 | 9/2002 | Yang | |
| 6,477,544 B1 * | 11/2002 | Bolosky et al. | 707/200 |
| 6,493,711 B1 | 12/2002 | Jeffrey | |
| 6,662,198 B2 | 12/2003 | Satyanarayanan et al. | 1/1 |
| 6,708,165 B2 | 3/2004 | Jeffrey | |
| 6,745,197 B2 | 6/2004 | McDonald | |
| 6,751,628 B2 | 6/2004 | Coady | |
| 6,778,979 B2 | 8/2004 | Grefenstette et al. | |
| 6,810,395 B1 | 10/2004 | Bharat | |
| 6,834,110 B1 | 12/2004 | Pacifici et al. | |
| 6,859,800 B1 | 2/2005 | Roche et al. | |
| 6,915,435 B1 * | 7/2005 | Merriam | 726/5 |
| 6,928,526 B1 | 8/2005 | Zhu et al. | |
| 6,947,954 B2 | 9/2005 | Cohen et al. | |
| 6,952,737 B1 * | 10/2005 | Coates et al. | 709/229 |
| 6,954,750 B2 | 10/2005 | Bradford | 1/1 |
| 6,996,580 B2 | 2/2006 | Bae et al. | |
| 7,047,386 B1 * | 5/2006 | Ngai et al. | 711/170 |
| 7,089,286 B1 | 8/2006 | Malik | |
| 7,137,065 B1 | 11/2006 | Huang et al. | |
| 7,146,388 B2 * | 12/2006 | Stakutis et al. | 707/204 |
| 7,158,970 B2 | 1/2007 | Chang et al. | |
| 7,174,368 B2 | 2/2007 | Ross, Jr. | 709/207 |
| 7,260,568 B2 | 8/2007 | Zhang et al. | |
| 7,269,564 B1 | 9/2007 | Milsted et al. | |
| 7,284,191 B2 | 10/2007 | Grefenstette et al. | |
| 7,287,025 B2 | 10/2007 | Wen et al. | |
| 7,313,556 B2 | 12/2007 | Gallivan et al. | |
| 7,325,041 B2 | 1/2008 | Hara et al. | |
| 7,458,082 B1 | 11/2008 | Slaughter et al. | 719/328 |
| 7,478,113 B1 | 1/2009 | De Spiegeleer et al. | |
| 7,526,478 B2 | 4/2009 | Friedman | |
| 7,533,291 B2 | 5/2009 | Lin | |
| 7,650,341 B1 | 1/2010 | Oratovsky et al. | |
| 7,698,650 B2 * | 4/2010 | Holmes | 715/762 |
| 7,860,706 B2 | 12/2010 | Abir | |
| 8,095,516 B2 * | 1/2012 | Margolus et al. | 707/689 |
| 2002/0002468 A1 | 1/2002 | Spagna et al. | |
| 2002/0019814 A1 | 2/2002 | Ganesan | |
| 2002/0038296 A1 | 3/2002 | Margolus et al. | |
| 2002/0059317 A1 | 5/2002 | Black et al. | |
| 2002/0107803 A1 | 8/2002 | Lisanke et al. | |
| 2002/0107877 A1 | 8/2002 | Whiting et al. | |
| 2002/0116402 A1 | 8/2002 | Luke | |
| 2002/0120925 A1 | 8/2002 | Logan | |
| 2002/0138376 A1 | 9/2002 | Hinkle | |
| 2002/0140960 A1 | 10/2002 | Ishikawa | |
| 2002/0143737 A1 | 10/2002 | Seki et al. | |
| 2002/0143871 A1 | 10/2002 | Meyer et al. | |
| 2002/0147733 A1 | 10/2002 | Gold et al. | |
| 2002/0161745 A1 | 10/2002 | Call | 707/1 |
| 2002/0178176 A1 | 11/2002 | Sekiguchi et al. | |
| 2002/0193986 A1 | 12/2002 | Schirris | |
| 2002/0194324 A1 | 12/2002 | Guha | |
| 2003/0028889 A1 | 2/2003 | McCoskey et al. | |
| 2003/0069803 A1 | 4/2003 | Pollitt | |
| 2003/0069877 A1 | 4/2003 | Grefenstette et al. | |
| 2003/0093790 A1 | 5/2003 | Logan et al. | |
| 2003/0105718 A1 | 6/2003 | Hurtado et al. | |
| 2003/0110130 A1 | 6/2003 | Pelletier | |
| 2003/0126247 A1 | 7/2003 | Strasser et al. | |
| 2003/0126362 A1 | 7/2003 | Camble et al. | |
| 2003/0135464 A1 | 7/2003 | Mourad et al. | |
| 2003/0145209 A1 | 7/2003 | Eagle et al. | |
| 2003/0182304 A1 * | 9/2003 | Summerlin et al. | 707/102 |
| 2003/0233455 A1 | 12/2003 | Leber et al. | |
| 2004/0003132 A1 | 1/2004 | Stanley et al. | |
| 2004/0034550 A1 | 2/2004 | Menschik et al. | |
| 2004/0034632 A1 | 2/2004 | Carmel et al. | |
| 2004/0054630 A1 | 3/2004 | Ginter et al. | |
| 2004/0064447 A1 | 4/2004 | Simske et al. | |
| 2004/0064537 A1 | 4/2004 | Anderson et al. | |
| 2004/0068604 A1 * | 4/2004 | Le et al. | 711/5 |
| 2004/0083211 A1 | 4/2004 | Bradford | 707/3 |
| 2004/0143609 A1 | 7/2004 | Gardner et al. | |
| 2004/0158559 A1 | 8/2004 | Poltorak | 707/3 |
| 2004/0168058 A1 * | 8/2004 | Margolus | 713/158 |
| 2004/0186827 A1 | 9/2004 | Anick et al. | |
| 2004/0193695 A1 | 9/2004 | Salo et al. | |
| 2004/0205448 A1 | 10/2004 | Grefenstette et al. | |
| 2005/0076293 A1 * | 4/2005 | Beresnevichiene | 715/514 |
| 2005/0097081 A1 | 5/2005 | Sellen et al. | |
| 2005/0097092 A1 | 5/2005 | Annau et al. | |
| 2005/0114282 A1 | 5/2005 | Todhunter | |
| 2005/0114370 A1 | 5/2005 | Lewak et al. | |
| 2005/0144157 A1 | 6/2005 | Moody et al. | |
| 2005/0160481 A1 * | 7/2005 | Todd et al. | 726/30 |
| 2005/0223067 A1 | 10/2005 | Buchheit et al. | |
| 2005/0234843 A1 | 10/2005 | Beckius et al. | |
| 2005/0283473 A1 | 12/2005 | Rousso et al. | |
| 2006/0026220 A1 * | 2/2006 | Margolus | 707/204 |
| 2006/0122998 A1 | 6/2006 | Bar-Yossef et al. | |
| 2006/0167679 A1 | 7/2006 | Tsai et al. | |
| 2006/0167842 A1 | 7/2006 | Watson | 707/3 |
| 2006/0173824 A1 | 8/2006 | Bensky et al. | |
| 2006/0230035 A1 | 10/2006 | Bailey et al. | |
| 2006/0265209 A1 | 11/2006 | Bradford | |
| 2006/0271526 A1 | 11/2006 | Charnock et al. | |
| 2007/0011154 A1 | 1/2007 | Musgrove et al. | |
| 2007/0022134 A1 | 1/2007 | Zhou et al. | |
| 2007/0030528 A1 | 2/2007 | Quaeler et al. | |
| 2007/0033177 A1 | 2/2007 | Friedman | |
| 2007/0033183 A1 | 2/2007 | Friedman | |
| 2007/0033410 A1 | 2/2007 | Eagle et al. | 713/176 |
| 2007/0038616 A1 | 2/2007 | Guha | |
| 2007/0050339 A1 | 3/2007 | Kasperski et al. | 707/3 |
| 2007/0050351 A1 | 3/2007 | Kasperski et al. | 707/4 |
| 2007/0061335 A1 | 3/2007 | Ramer et al. | |
| 2007/0088687 A1 | 4/2007 | Bromm et al. | |
| 2007/0192284 A1 | 8/2007 | Finley et al. | |
| 2007/0198470 A1 | 8/2007 | Freedman et al. | |
| 2007/0233692 A1 | 10/2007 | Lisa et al. | |
| 2007/0245108 A1 | 10/2007 | Yasaki et al. | |
| 2007/0253643 A1 | 11/2007 | Nagarajan | |
| 2007/0255686 A1 | 11/2007 | Kemp et al. | |
| 2007/0266009 A1 | 11/2007 | Williams | |
| 2007/0282811 A1 | 12/2007 | Musgrove | |
| 2007/0282826 A1 | 12/2007 | Hoeber et al. | |
| 2007/0288445 A1 | 12/2007 | Kraftsow | |
| 2007/0288450 A1 | 12/2007 | Datta et al. | |
| 2008/0005651 A1 | 1/2008 | Grefenstette et al. | |
| 2008/0059187 A1 | 3/2008 | Roitblat et al. | |
| 2008/0059512 A1 | 3/2008 | Roitblat et al. | |
| 2008/0077570 A1 | 3/2008 | Tang et al. | |
| 2008/0097975 A1 | 4/2008 | Guay et al. | |
| 2008/0104032 A1 | 5/2008 | Sarkar | |
| 2008/0133570 A1 | 6/2008 | Allen et al. | |

| | | | |
|---|---|---|---|
| 2008/0147644 | A1 | 6/2008 | Aridor et al. |
| 2008/0155192 | A1 | 6/2008 | Iitsuka |
| 2008/0162498 | A1 | 7/2008 | Omoigui |
| 2008/0189273 | A1 | 8/2008 | Kraftsow et al. |
| 2008/0195601 | A1 | 8/2008 | Ntoulas et al. |
| 2008/0235202 | A1 | 9/2008 | Wang et al. |
| 2008/0288474 | A1 | 11/2008 | Chin et al. |
| 2009/0024612 | A1 | 1/2009 | Tang et al. |
| 2009/0182737 | A1 | 7/2009 | Melman |
| 2009/0182789 | A1 | 7/2009 | Sandorfi et al. |
| 2009/0287685 | A1 | 11/2009 | Charnock et al. |
| 2009/0313248 | A1 | 12/2009 | Balachandran et al. |
| 2009/0327625 | A1 | 12/2009 | Jaquette et al. |

FOREIGN PATENT DOCUMENTS

| | | |
|---|---|---|
| JP | 2004213237 | 7/2004 |
| WO | WO 03/019412 | 3/2003 |
| WO | WO 2008/080140 | 7/2008 |

OTHER PUBLICATIONS

Conlon, S., "Automatic Web Searching and Categorizing Using Query Expansion and Focusing", (Mississippi University.), 6p, Jan. 2003.

Crestani, F. et al.; "Is This Document Relevant? . . . Probably: A Survey of Probabilistic Models in Information Retrieval"; ACM Computing Surveys vol. 30, No. 4, Dec. 1998.

E. M. Voorhees, "Query expansion using lexical-semantic relations", Annual ACM Conference on Research and Development in Information Retrieval, Proceedings of the 17th annual international ACM SIGIR conference on Research and development in information retrieval, 1994, Dublin, Ireland, Aug. 1994, pp. 61-69, ISBN:0-387-1988-X.

Gauch et al., "A Corpus Analysis Approach for Automatic Query Expansion and Its Extension to Multiple Databases" *ACM Transactions on Information Systems*, vol. 17, No. 3, Jul. 1999, pp. 250-269.

Gehler, P. et al.; "The Rate Adapting Poisson Model for Information Retrieval and Object Recognition"; Proceedings of the 23rd International Conference on Machine Learning, 2006.

http://www.googleguide.com/tools.html <retrieved on Jul. 8, 2009>.

http://www.lexisnexis.com/toolbar/help/using.htm#HighlightAndClick <retrieved on Jul. 8, 2009>.

Ilyas, I. et al.; "Adaptive Rank-Aware Query Optimization in Relational Databases"; ACM Transactions on Database Systems; vol. 31. No. 4, Dec. 2006.

Luk, R. et al.; "A Comparison of Chinese Document Indexing Strategies and Retrieval Models"; ACM Transactions on Asian Language Information Processing, vol. 1, No. 3, Sep. 2002.

Margulis, E.; "Modelling Documents with Multiple Poisson Distributions"; Information Processing & Management vol. 29, No. 2, 1993.

Margulis, E.; "N-Poisson Document Modelling"; SIGIR '92.

Mei, Q. et al.; "A Study of Poisson Query Generation Model for Information Retrieval"; SIGIR '07 Proceedings, Session 12: Formal Models.

Mitra et al., "Improving Automatic Query Expansion", Annual ACM Conference on Research and Development in Information Retrieval, Proceedings of the 21st annual international ACM SIGIR conference on Research and development in information retrieval, Melbourne, Australia, pp. 206-214, Year of Publication: 1998, ISBN:1-58113-015-5.

Ozmutlu, H. et al.; "Analysis of large data logs: an application of Poisson sampling on excite web queries"; Information Processing and Management, vol. 38, 2002.

Robertson, S. et al.; "Some Simple Effective Approximations to the 2-Poisson Model for Probabilistic Weighted Retrieval"; Centre for Interactive Systems Research, London.

Roelleke, T.; "A Frequency-based and a Poisson-based Definition of the Probability of Being Informative"; SIGIR '03.

Tao, Y. et al.; "Indexing Multi-Dimensional Uncertain Data with Arbitrary Probability Density Functions"; Proceedings of the 31st VLDB Conference, Norway 2005.

Volkmer et al., "Exploring Automatic Query Refinement for Text-Based Video Retrieval", *IEEE International Conference on Multimedia and Expo*, Jul. 9-12, 2006, pp. 765-768, Toronto, Ont., ISBN: 1-4244-0366-7.

Mosher, Sue, "Outlook Tips and Techniques," Windows IT Pro, Feb. 12, 2001.

International Search Report and Written Opinion from PCT/US2010/060899 dated Mar. 3, 2011.

International Search Report and Written Opinion from PCT/US2010/059775 dated Mar. 16, 2011.

International Search Report and Written Opinion from PCT/US11/22472 dated Mar. 30, 2011.

International Search Report and Written Opinion from PCT/US11/26924 dated Apr. 29, 2011.

Amati, G. et al.; "Probabilistic Models of Information Retreival Based on Measuring the Divergence from Randomness"; ACM Transactions on Information Systems, vol. 20, No. 4. Oct. 2002.

Attar et al., "Local Feedback in Full-Text Retrieval Systems", Journal of the ACM (JACM), vol. 24, Issue 3 (Jul. 1977), pp. 397-417, ISSN:0004-5411.

Cai et al., "Automatic Query Expansion Based on Directed Divergence", Proceedings of the International Conference on Information Technology: Coding and Computing, p. 8, 2002, ISBN:0-7695-1506-1.

Xu et al., "Query expansion using local and global document analysis," in Proc. of ACM-SIGIR 1996, Zurich, Switzerland, Aug. 18-22, 1996, pp. 4-11.

Yan, T. et al.; "The SIFT Information Dissemination System"; ACM Transactions on Database Systems, vol. 24, No. 4, Dec. 1999.

Zakariah, R. et al.; "Detecting Junk Mails by Implementing Statistical Theory"; IEEE Proceedings of the 20th International Conference on Advanced Information Networking and Applications, 2006.

Roitblat, Herbert L. (2004), "Electronic Data Are Increasingly Important to Successful Litigation", Trends in Electronic Data.

Roitblat, Herbert L. (2005), "Document Retrieval", DolphinSearch, Inc.

"The Sedona Principles: Best Practices Recommendations & Principles for Addressing Electronic Document Production," *The Sedona Conference Working Group Series*, Jul. 2005 Version.

Meng, W., et al., "Building Efficient and Effective Metasearch Engines," *ACM Computing Surveys, ACM*, New York, NY, US, US, vol. 34, No. 1, Mar. 1, 2002, pp. 48-89.

Comparing IBM Tivoli Storage Manager and Veritas NetBackup in Real-World Environments. A summary by IBM of the whitepaper and benchmark written by Progressive Strategies, Nov. 8, 2002.

Beyond Backup Toward Storage Management by M. Kaczmarski, T. Jiang and D.A. Pease. IBM Systems Journal, vol. 42, pp. 322-337, Nov. 2, 2003.

PCT Search Report and Written Opinion dated Jun. 18, 2008, PCT/US07/13483.

PCT Search Report and Written Opinion dated May 8, 2009, PCT/US2009/032990.

* cited by examiner

| PHASE 1 |
| --- |
| 1. Explode nested/compound documents, files, or data containers into components or items until no or little nesting is present in a system.
2. Extract text from each item (e.g., emails, files, images, instant messages, audio/video recordings, scanned documents, etc.)
3. Link extracted text with its source item.
4. Perform a content categorization utilizing a context analysis engine.
5. Associate one or more business topics with each document instance. |

| PHASE 2 |
| --- |
| 1. Identify unique custodians in the system.
2. Identify business categories in the system.
3. Analyze and consolidate the categories in terms of retention policies.
4. Gather retention policies that apply to the documents in the system.
5. Identify algorithms that can allow retention policies to be associated with a custodian or group of custodians based on their role or position in the business that the system represents.
6. Save and codify the identified algorithms in a form that can be applied to de-duplicated documents in the system. |

| PHASE 3 |
| --- |
| 1. Run the codified algorithm to associate one or more retention policies with each document, each policy specifying a retention period.
2. Set the retention period for each document to the one that expires the furthest in the future.
3. Continuously monitor retention periods to see if any instance of any document is about to expire. If so, place it in a review queue where it can be marked for deletion, modification, or suspension.
4. Adjust retention periods for instances in the system as external (e.g., laws) and/or internal (e.g., corporate) retention policies change. |

SYSTEM AND METHOD FOR MANAGEMENT OF RETENTION PERIODS FOR CONTENT IN A COMPUTING SYSTEM

CROSS-REFERENCE TO RELATED APPLICATIONS

This application claims priority from U.S. Provisional Patent Application Ser. No. 60/651,121, filed Feb. 8, 2005, and entitled "SYSTEM AND METHOD FOR MANAGEMENT OF RETENTION PERIODS FOR CONTENT IN A COMPUTING SYSTEM," which is hereby incorporated herein by reference in its entirety for all purposes.

FIELD OF THE INVENTION

This invention relates generally to data retention and, more particularly, to document retention policy and compliance management of a Single-Instance Storage (SIS) system in a distributed computing environment.

BACKGROUND OF THE INVENTION

Many entities (e.g., businesses, research labs, governmental agencies, etc.) are required by law to retain data (e.g., electronic documents, digital images, audio/video files, etc.) for a certain period of time. In some cases, an entity may be required to destroy data to adhere to privacy regulations. To comply with various laws and regulations, it is becoming increasingly important particularly for businesses to establish some kind of a document retention policy over their data storage systems or repositories. Such a document retention policy generally specifies how business documents should be managed and/or destroyed. For instance, a document retention policy may specify a period of time to retain a particular document or it may require an administrative review by a user before a document can be destroyed. The ability for an entity to understand and structure the life cycle of its documents as they are created, maintained, and ultimately destroyed can greatly impact the infrastructure and processes required to house its content.

Business documents are often held in various forms (e.g., text files, graphic files, emails, etc.), which adds to the complexity of controlling and managing them. Moreover, each of these business documents may have duplicates (i.e., identical copies) maintained or held in different locations (e.g., different directories on the same hard drive, different hard drives, different servers, etc.) for various reasons. Such an inefficient use of space (i.e., document duplication) can contribute to the complexity in resolving problems associated with business document retention. Embodiments of the present invention provide a solution to address this problem and more.

SUMMARY OF THE INVENTION

Embodiments of the present invention provide an automated system and method for establishing and managing document retention policy in a distributed computing environment. Any data storage system capable of storing de-duplicated data can be adapted to implement embodiments of the invention.

One such storage system is the ActiveVault system developed by Renew Data Corporation headquartered in Austin, Tex., USA. The ActiveVault system can maintain a single copy of every business document in various forms (e.g., emails, files, images, sound recordings, instant messages, scanned documents, etc.) via a fully de-duplicated database (i.e., the ActiveVault). In one embodiment, the ActiveVault system is a Single-Instance Storage (SIS) system integrated with a unique de-duplication technology. Within this disclosure, the term "Single-Instance Storage" refers to a system with the ability to keep one single copy of content (i.e., a single instance) associated with multiple custodians. In conventional data storage systems, de-duplication is typically performed as a separate process to remove from a set of email messages or files forensically identical extra copies. However, with the ActiveVault system, no additional de-duplication is necessary upon output because the ActiveVault stores de-duplicated data. Examples of various aspects and embodiments of the ActiveVault system are disclosed in Appendices A, B, and C attached to this application.

Since the ActiveVault (and other SIS systems) can have references for every instance of every business document in a computing system, a retention period can be correspondingly associated with every instance. By establishing and monitoring the individual retention periods, references to instances of the document and the associated content can be deleted in a timely manner. When the retention period for the last instance of the business document expires, it too can be deleted.

Embodiments of the invention can address the problem associated with assigning retention periods to each instance of a business document. In one embodiment, a method for establishing and managing document retention periods comprises the steps of loading documents into a database as individual components or items; establishing a custodian for each instance of a document; categorizing the document's content into a plurality of categories; assigning retention periods to the content by category; and continuously monitoring retention policies according to the assigned retention periods.

Within this disclosure, the phrase "custodian" refers to the person or entity who either created the document or who maintained and kept a copy of the document. To establish a custodian, information can be derived from the source of the data in some cases (e.g., a source directory path from where the file was culled or an email database from where it was retrieved.) In other cases, the path names associated with a custodian may need to be determined by a business process and the resulting information added to the database (e.g., the ActiveVault). Once it is added, the custodian path names can be matched to content instances and the relevant relationships established. Once a custodian domain or context is established it can be used to assign retention periods to content associated with the custodian.

According to embodiments of the invention, in categorizing the content of a document into a plurality of categories, the document can be assigned to at least one category, but could be assigned to many. In the event that a document is assigned to multiple categories, the one with the longest retention period is retained. In one embodiment, if a document cannot be assigned to a category automatically or manually, it can potentially be deleted as it may be of no business value. In one embodiment, the categorization process is automated, since there can be billions of documents. In one embodiment, the categorization process allows a small percentage of exceptions to automation for documents that cannot be categorized automatically. As one skilled in the art can appreciate, various categorization methods exist and can be adapted to suit or otherwise implemented with embodiments of the invention.

Traditional methods of document management are based on paper filing systems and human intervention. In today's computing environment, managing document retention periods often cannot reasonably be achieved using manual approaches, due to the sheer volume and cost of processing electronic documents, which could be in the millions or even billions. Embodiments of the invention provide a solution to control and manage document retention periods, allowing businesses and various entities to comply with various laws and regulations governing documents and document retention periods.

Other objects and advantages of the present invention will become apparent to one skilled in the art upon reading and understanding the detailed description of the preferred embodiments described herein with reference to the following drawings.

BRIEF DESCRIPTION OF THE DRAWINGS

FIG. 8 is a diagrammatic representation of an exemplary application of a retention policy to stored documents according to one embodiment of the invention.

DETAILED DESCRIPTION

Figure 1:
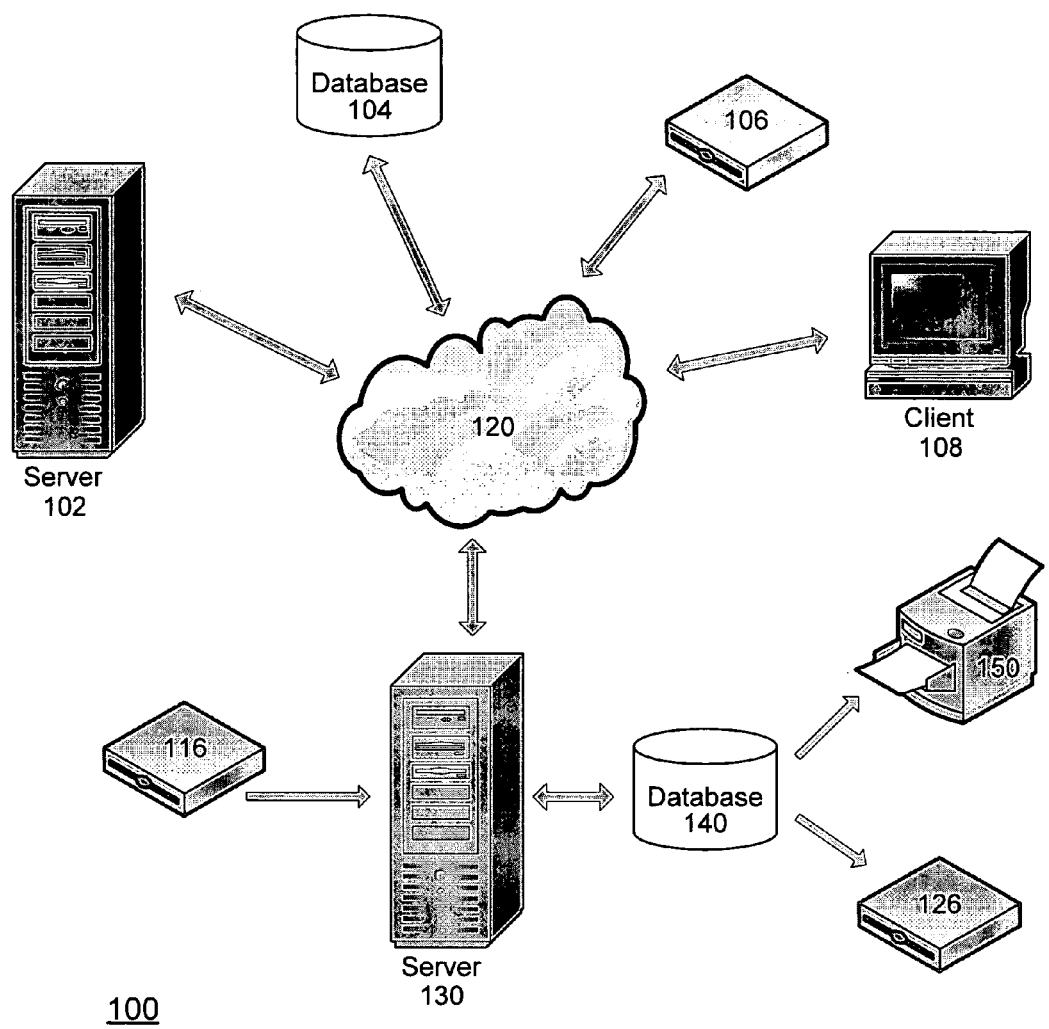
FIG. 1 is a diagrammatic architectural representation of an exemplary computing system implementing embodiments of the present invention.

The invention and various features and advantageous details thereof are explained more fully with reference to the exemplary, and therefore non-limiting, embodiments that are illustrated in the accompanying drawings and detailed in the following description. Descriptions of known programming techniques, computer software, hardware, operating platforms and protocols may be omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments of the methods and systems described herein can address the very pertinent and difficult problem of business document retention. Document retention can be critical to businesses and entities alike. For example, keeping a certain document longer than required by law could be an issue in a litigation situation and may cause damages that otherwise could have been avoided had the document be destroyed in compliance with the applicable laws and/or regulations. The converse can also be true. Premature destruction of a business document can have negative consequences in a litigation situation because it may be seen as an attempt to make the document invalid or unusable as evidence. Utilizing embodiments of the invention disclosed herein to manage retention periods for content can help businesses and entities alike to enforce retention policies in accordance with internal policies as well as in compliance with applicable laws and/or regulations. In particular, embodiment of the invention can address the following issues:

In a business setting, it is not uncommon to have multiple copies of an original document. When these copies are loaded into a database from backup storage media (e.g., tapes, optical discs, hard drives, memory cards, etc.), information about the original document as well as its copies is typically limited. For example, the detailed context about who was keeping which copy and why may not be known. Even if the original file location is known, one may not be able to determine a reason for keeping the document and/or its copies. Since the retention policy of a document is often subject to the context in which it is kept, loss of that information can make setting the proper retention policy more difficult.

Multiple copies of the same instance of a document (collectively referred to as instances) are often recovered from backup media spanning a wide period of time. Any de-duplication involved in processing documents for retention management purposes must capture the history of these instances as presented in the backup media.

It is possible that different instances of the same document could be assigned with different retention policies.

Non-compliant documents (i.e., the retention period has expired) must be deleted from the system as soon as the policy expires. However, if one document has more than one instance, only non-compliant instance(s) of the document would need to be removed (i.e., deleted).

When an instance is deleted, all references thereto must also be deleted.

If a document is subject to discovery in a litigation situation, the retention policy for the relevant instance(s) of the document would need to be suspended until the litigation situation is resolved.

Once the litigation situation is resolved, the retention policy would need to be applied in a timely manner to properly remove any document(s) and/or instance(s) thereof whose retention period has expired during the suspension period.

In one embodiment, a de-duplication process may be employed to remove identical extra copies of business documents. De-duplication allows a vast amount of data to be saved in the minimal storage space. In conventional single-instance storage (SIS) systems, de-duplication is typically performed as a separate process. De-duplicated data has the property that every instance of a content item exists only once and all duplicates exist as references to the single instance. However, this can create a problem when managing document retention. For example, different instances of a document may require different retention polices, depending on the context of the document, the custodian who held it, and for what purpose. In addition, when the retention period on a particular instance expires, that instance would need to be destroyed, but not the other instances for which retention periods are still active. This is a new problem for SIS systems that store de-duplicated content.

Embodiments of the invention disclosed herein can be applied to any data storage system capable of storing de-duplicated data (e.g., the ActiveVault system developed by Renew Data Corporation, the assignee of the present application). Within this disclosure, the term "document" refers to a collection of data stored on a computer readable medium (i.e., any memory or storage medium that can be read by a computer, e.g., random access memory (RAM), read-only memory (ROM), hard drive, floppy disk, backup tapes or cartridges, compact disc ROM (CD-ROM), etc.) Within this disclosure, the term "document" may refer to a single or a compound document. A document can have one or more components to hold its contents, metadata, and location. As an example, a first component of a compound document may be a pointer designating the location of the compound document. A second component of the compound document may be a single document embedded within, attached to, or referenced by the compound document. Within this disclosure, the term "component" may be used interchangeably with the term "item". Exemplary items can include emails, text files, instant messages, voice recordings, scanned documents, video clips, digital images, etc. The term "content" used herein may refer to any information (e.g., a string of bytes) that is contained in a document. Metadata generally contain information about the document (e.g., file name, date of creation, date of last modification, length, etc.).

FIG. 1 is a diagrammatic representation of an exemplary computing system 100 implementing embodiments of the present invention. In the example shown in FIG. 1, computing system 100 comprises server computer 102, enterprise database 104, data storage device or medium 106, client computer 108, network 120, and database server 130. Database server 130 may be coupled to database 140 and data storage device 116 (e.g., a backup tape drive, etc.). Database 140 may be coupled to a persistent storage medium 126 (e.g., an optical storage or tape drive), and input/output device(s) (I/O) 150 (e.g., a printer, monitor, etc.). As shown in FIG. 1, server computer 102, enterprise database 104, data storage device 106, and client computer 108 may be bi-directionally coupled to network 120. As one skilled in the art can appreciate, computing system 100 is programmed with appropriate computer-executable software instructions that, when executed by a processor (e.g., at database server 130), operate to implement the processes and steps described below according to embodiments of the invention. Suitable programming techniques, languages, and network protocols are known to those skilled in the art and thus are not further described herein.

In one embodiment, database server 130 is configured to maintain a single copy of every business document (e.g., emails, memos, letters, invoices, reports, images, sound recordings, instant messages, video clips, presentations, computer-assisted drawings, scanned documents, other electronic files, etc.) in computing system 100. In one embodiment, business documents are extracted from various data sources (e.g., server computer 102, enterprise database 104, data storage device or medium 106, client computer 108, and data storage device 116). In one embodiment, database 140 is a fully de-duplicated database in which every document is represented only once via a single instance and all duplicative instances refer to the single instance.

In one embodiment, database 140 may allow the content of a document to be associated with metadata and locations pertaining to the document. In one embodiment, database 140 may also allow the stored content to be associated with multiple locations and pieces of stored metadata, stored metadata to be associated with multiple locations and pieces of stored content, and stored locations to be associated with multiple pieces of stored metadata and content. In one embodiment, database 140 may be a single depository (e.g., the ActiveVault database) capable of storing and relating the content, metadata, and location of any document extracted from server computer 102, enterprise database 104, client computer 108, or data source 106. To avoid duplication, documents extracted from server computer 102, enterprise database 104, data storage device or medium 106, client computer 108, and data storage device 116 are separated into components (e.g., content, metadata, file location, etc.) and only components that are not already resident in database 140 are added. Embodiments of the invention can be implemented with any database capable of ensuring that all loaded content is maintained in a single instance form and that all history is maintained for every instance of a document that is read into the database.

Figure 2:
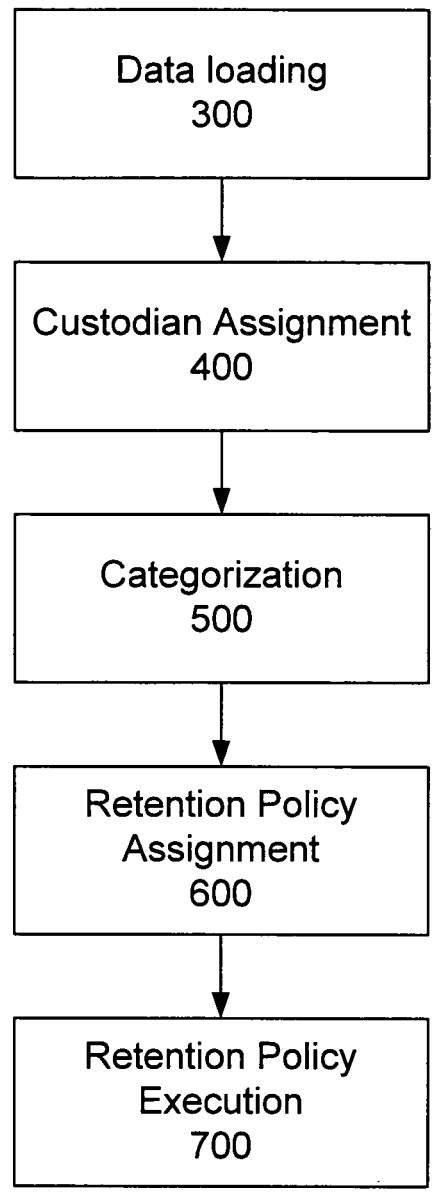
FIG. 2 is a flow diagram illustrating exemplary processes implementing embodiments of the present invention.

FIG. 2 shows a flow diagram 200 illustrating exemplary processes (i.e., data loading 300, custodian assignment 400, categorization 500, retention policy assignment 600, and retention policy execution 700) implementing embodiments of the present invention. Briefly, data loading 300 allows documents extracted from various data sources (e.g., server computer 102, enterprise database 104, data storage device or medium 106, client computer 108, and data storage device 116) to be loaded into a database (e.g., database 140). In custodian assignment 400, each loaded document instance is assigned to a custodian. In categorization 500, each document instance is examined and associated with one or more topics. In retention policy assignment 600, the retention policy for each document instance is assigned based on a plurality of factors (e.g., business rules, internal policies, regulatory requirements, etc.). Although processes described herein are presented as discrete steps, they can be (and in one embodiment are) executed on an ongoing basis to keep the various steps in synchronization and to insure that retention policies are always set for every unique instance of a document in a system as data is constantly being added to the system. Data loading 300 will be further described below with reference to FIG. 3. Custodian assignment 400 will be further described below with reference to FIG. 4. Categorization 500 will be further described below with reference to FIG. 5. Retention policy assignment 600 will be described below with reference to FIG. 6. Retention policy execution 700 will be further described below with reference to FIG. 7.

Figure 3:
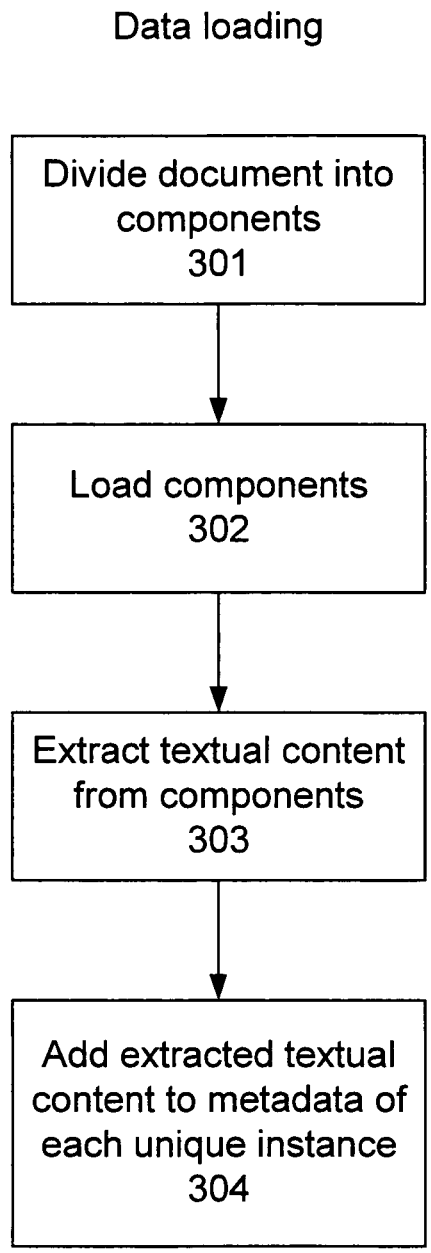
FIG. 3 is a flow diagram illustrating one embodiment of a data loading process of FIG. 2.

FIG. 3 shows data loading 300 according to one embodiment of the invention. At step 301, documents of all types and from a variety of sources in a computing system (e.g., system 100) can be processed at a server (e.g., server 130) for loading into a database (e.g., database 140). More specifically, at step 301, documents are processed into their components so that each component can be managed and tracked as an individual entity in the system. A document can be of any types and may be in any known business document formats (e.g., email, instant messages, recorded speech, digital images, video recordings, etc.). A document can be a compound document which encloses another document. For example, an email message may be a compound document having a message body, one or more location pointers, and one or more email properties (e.g., To, From, Subject, CC, BCC, Attachment, etc.). The location pointers and email properties comprise the metadata of the message. Depending on the originating email client software, the message body can be in multiple formats (e.g., HTML, ASCII Text, Rich Text, etc.).

One embodiment of the invention implements an SIS system (e.g., the ActiveVault system) and holds one copy of the message body and attachments within the database. Duplicate references access desired content through a set of database pointers and other properties (e.g., Sender, Recipient, etc.) which allow the content to have one-to-many references. For example, an email sent to 10 recipients can be stored within the database as a single email body with 11 database record references (i.e., instances) of the message. In this embodiment, to ensure the forensic accuracy of single-instance storage and to identify duplicates, when an email is loaded into the database, digital fingerprints are created with hash values for both the message metadata and the message body. A hash is also called a digest, which is a kind of signature for a stream of data that represents the content. The links between the parts (i.e., components) for a particular instance of the email are tracked so that it can be extracted from the database exactly as it was loaded.

At step 302, processed document components are loaded into the database. In this embodiment, a component is loaded only if that component does not already exist in the system. If it already exists, relevant metadata about the component (e.g., creators, dates and other forensically important properties of the component) is captured, but the component is not added into the database. Instead, a pointer to the already loaded copy is recorded, and a history of the component is updated to register the new copy. This ensures that only a single instance of the actual content is stored in the system. All instances are recorded together with relevant changes to the metadata about each instance. More examples of single-instance storage processing can be found in the attached Appendices.

At step 303, loaded document components are scanned for extracting their textual content. Since these components can have various formats, they may be processed into a consistent format. According to one embodiment of the invention, this step can be done using text extraction engines (e.g., Insight Discoverer™ Extractor available from TEMIS USA, Alexandria, Va., USA).

At step 304, extracted text is added to the metadata for each unique instance in the system. At this point, the data is loaded and the processes of custodian assignment and indexing (i.e., categorization) can commence. In one embodiment, these processes (i.e., custodian assignment 400 and categorization 500) occur sequentially since the process of categorization may be dependent on the custodian assignment.

Figure 4:
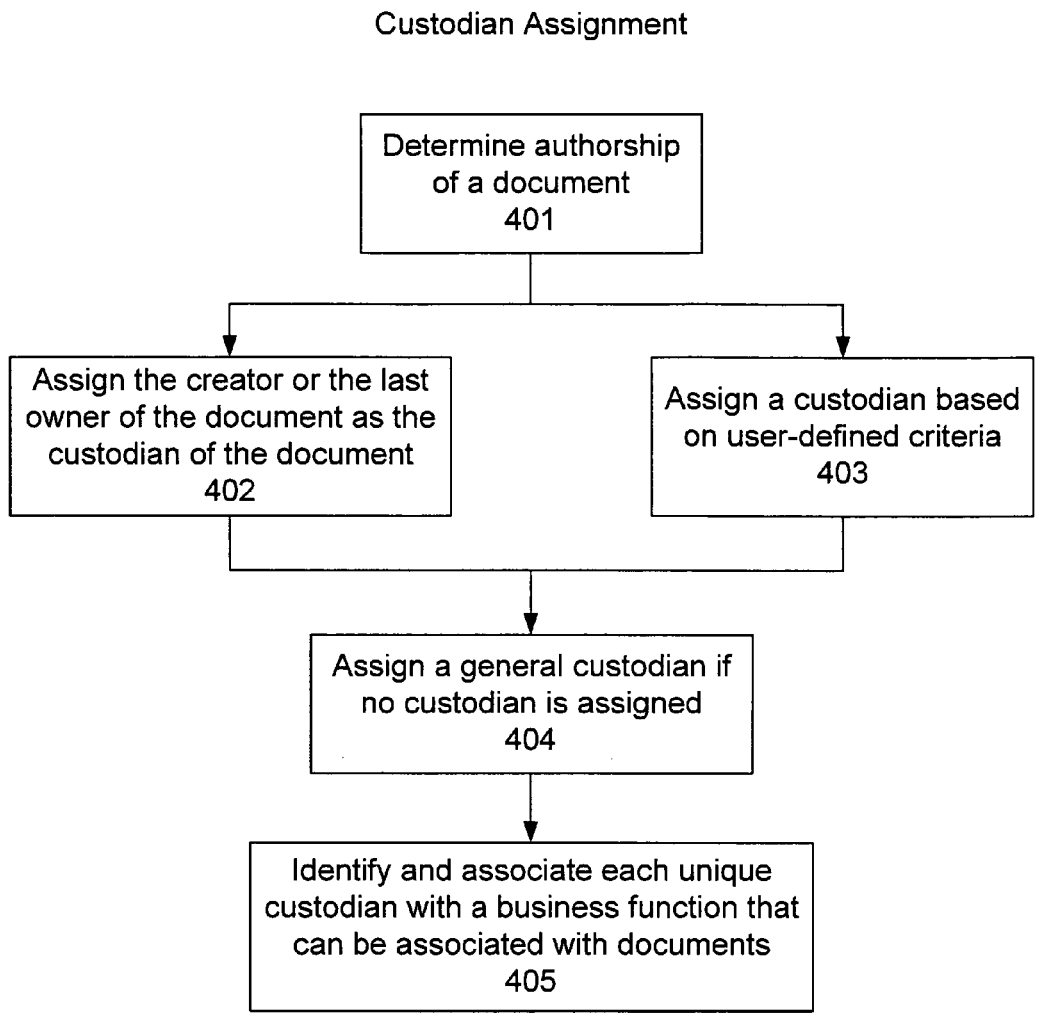
FIG. 4 is a flow diagram illustrating one embodiment of a custodian assignment process of FIG. 2.

FIG. 4 shows a flow diagram 400 illustrating one embodiment of a custodian assignment process of FIG. 2. In one embodiment, the assignment of a custodian to an instance of a document may subsequently be used in setting a retention policy (e.g., retention policy assignment 600). The custodian can be determined via multiple methods. For example, it can be the document's creator, the document's current owner, or a person who satisfies certain user-specified criteria.

In one embodiment, at step 401, the metadata of a document is first analyzed to determine the authorship (i.e., creator) of the document. When the document is loaded into the system (e.g., via data loading 300 of FIG. 3), its metadata may include information about who created the document or who the last owner of the document was.

At step 402, if the metadata includes information about who created the document, the custodian of the document is assigned to the creator. Alternatively, if the metadata includes information about who the last owner of the document was, the custodian of the document is assigned to the last owner. In one embodiment, if information about both the creator and the last owner of the document can be found in the metadata of the document, the custodian is assigned to the creator. Alternatively, if information about both the creator and the last owner of the document can be found in the metadata of the document, the custodian is assigned to the last owner.

At step 403, regardless of whether the metadata contains information about the creator and/or the last owner of the document, a custodian can be defined by associating the presence of keywords or phrases in the metadata according to user-specified criteria. For example, it may be possible to assign a custodian by examining the pathname of a file to see if it contains certain initials and/or names of a person. In one embodiment, this can be done through a process external to the system in which a user may be able to select or define pathnames and files names that can be assigned to a custodian. In one embodiment, documents that meet certain user-defined criteria are assigned to a user-specified custodian(s).

At step 404, documents that cannot be assigned to a custodian at either step 402 or step 403 are assigned to a general or default custodian, according to one embodiment of the invention. This step ensures that every document loaded into the database is assigned to a custodian.

At step 405, each unique custodian in the system is identified and all the documents associated with that custodian are linked to them. According to embodiments of the invention, a specific instance of a document can only be associated with one custodian. In one embodiment, each unique custodian is also associated with a business function. In one embodiment, each business function is associated with one or more topics. In one embodiment, topics are determined in a categorization process (e.g., categorization 500 described below).

Figure 5:
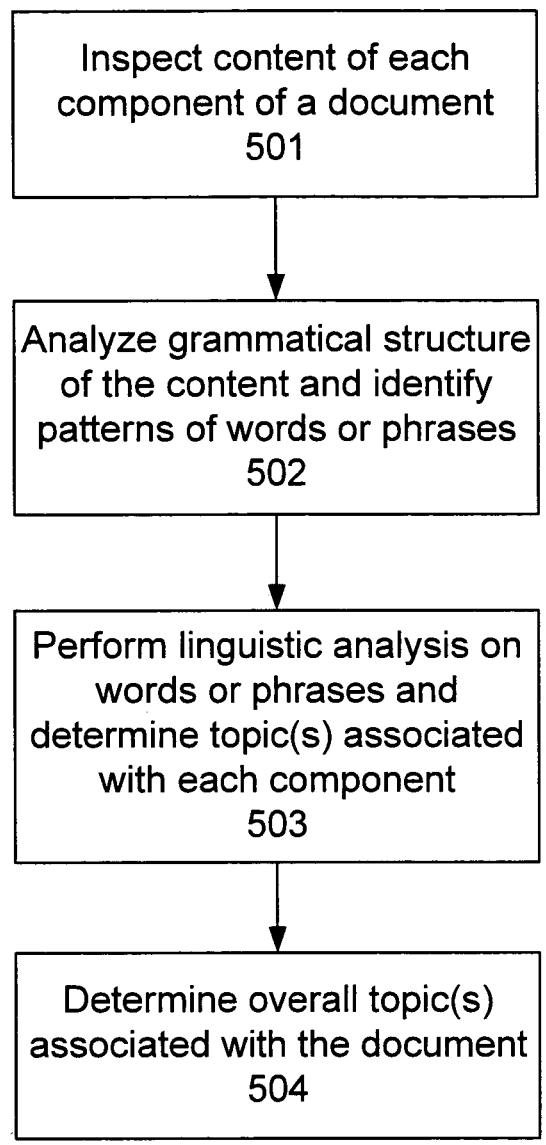
FIG. 5 is a flow diagram illustrating one embodiment of a categorization process of FIG. 2.

FIG. 5 shows a flow diagram 500 illustrating one embodiment of a categorization process of FIG. 2. The process of categorization examines the meaning and context of words in the data to determine the subject being described or discussed in a document. At step 501, the actual content of each component of each document is inspected. If the document is in a structured format, the text extracted in the earlier step (i.e., step 303 of FIG. 3) is used to complete the inspection, according to one embodiment of the invention. In this case, all the unique words in the components are identified and added to an index of all the words present in the system, together with pointers to where the words occur.

At step 502, the grammatical structure of the content is analyzed and patterns or phrases are identified and notated. Any text pattern recognition software application capable of performing statistical analysis can be utilized to implement this step (e.g., Insight Discoverer™ Categorizer available from TEMIS USA, Alexandria, Va., USA).

At step 503, a linguistic analysis is performed on the words and phrases identified at step 502 to determine one or more topics being addressed by the component. Any text mining software application capable of performing linguistic analysis can be utilized to implement this step (e.g., Insight Discoverer™ Categorizer or a linguistic engine called XELDA® available from TEMIS USA, Alexandria, Va., USA). The identified topic(s) is then associated with that component.

At step 504, once all the components in a document are examined, the topic(s) identified at step 503 are examined to determine an overall topic or topics to be associated with the whole document. One document may be associated with multiple topics.

Figure 6:
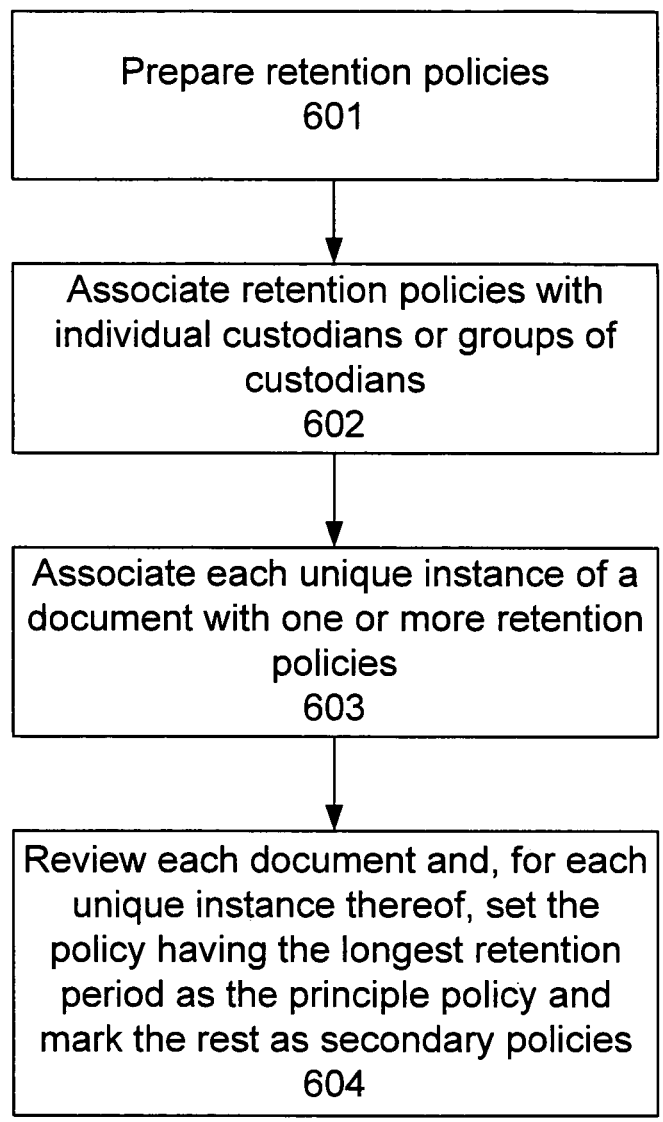
FIG. 6 is a flow diagram illustrating one embodiment of a retention policy assignment process of FIG. 2.

FIG. 6 shows a flow diagram 600 illustrating one embodiment of a retention policy assignment process of FIG. 2. At step 601, the retention policies for the organization are first prepared. These can take into account the categories identified in the categorization step (i.e., step 504 of FIG. 5). In one embodiment, each identified category is associated with at least one retention policy statement. In one embodiment, the general custodian is included in the definitions of all retention policies.

Retention policies can be based on a variety of factors (e.g., business rules, policies, and statutory/regulatory requirements, etc.). Retention policies can be associated with a position function, a time period when a document (which could be a component, e.g., an attachment, of another document) is created, and/or the nature or context of the information the document describes or discusses.

As an example, Securities and Exchange Commission (SEC) regulations require that all broker-customer communications be kept for several years (e.g., 3 or 6), depending on the content of the communication. Through steps described above, appropriate retention policies can be associated with custodians that are brokers. Such a retention policy can start on the date the communication is completed (e.g., when a broker sent an email to a customer) and can be set for 3 or 6 years, depending on the nature of the information communicated.

As another example, in the case of an insurance policy, the retention policy can be set according to the state(s) in which the insurance policy was issued and the insured person or assets are located. The retention policy can start from the issue date of the insurance policy, and can continue for some period after the insurance policy expires or is claimed against, depending upon the nature of the insurance policy (i.e., whether it is a business insurance policy, life insurance policy or one protecting assets or something else that may be insured).

Other retention policies may be determined by laws and/or regulations. For example, current tax laws require that documents pertaining to the finances of a business must be kept for at least 7 years. In some cases, certain business documents many need to be kept indefinitely while the business is functioning. Other legal (e.g., statutory or court-imposed) or self-imposed (e.g., internal corporate retention policies) retention policies can also be used in conjunction with embodiments of this invention. Once all retention policies are assigned, they can be continuously monitored and acted upon, according to one embodiment of the invention.

At step 602, the retention policy or policies prepared at step 601 are associated with individual custodians or groups of custodians. In one embodiment, the groups of custodians are defined by business functional groups (e.g., executives, administrators, managers, sales representative, support staff, etc.).

At step 603, rules can be created to associate each unique instance of a document with one or more retention policies. More details on steps 602-603 will be further described below with reference to Phase 3 of FIG. 8.

At step 604, once all the retention policies are assigned, each document is reviewed. The policy that has the longest retention period is set as the principle policy and all the other associated policies are marked as secondary policies for that document instance. According to embodiments of the invention, each unique instance of every document has at least one policy assigned. According to embodiments of the invention, a document can have multiple policies of equal or differing lengths of retention periods.

Figure 7:
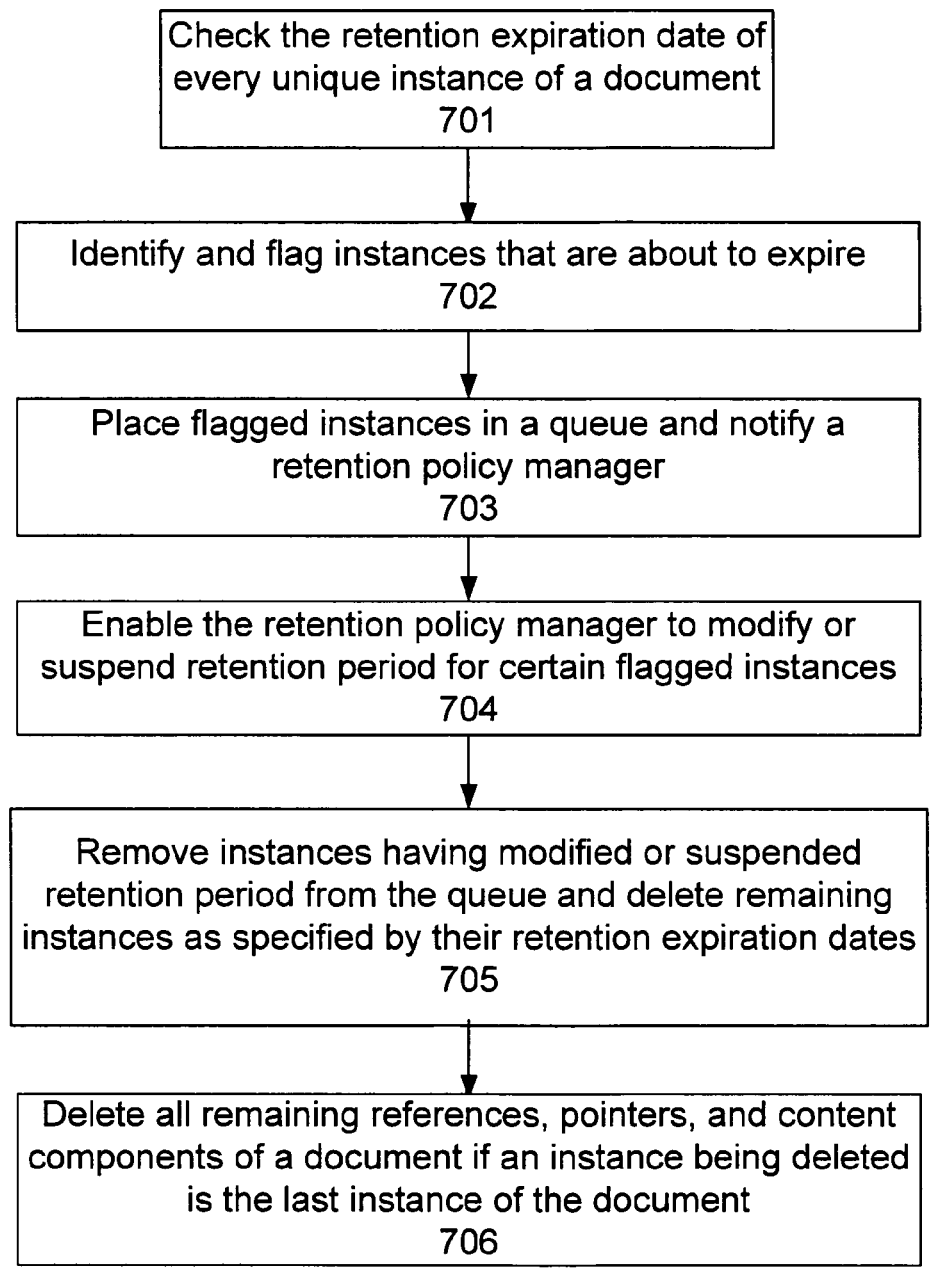
FIG. 7 is a flow diagram illustrating one embodiment of a retention policy execution process of FIG. 2.

FIG. 7 shows a flow diagram 700 illustrating one embodiment of a retention policy execution process of FIG. 2. At step 701, the underlying system, programmed with suitable computer-executable instructions as described above, operates to check the retention expiration date of every unique instance of a document. In one embodiment, the system performs this function at a defined interval. In one embodiment, the system performs this function once every 24 hours.

At step 702, all document instances identified at step 701 as nearing expiration are flagged for processing. According to one embodiment of the invention, the period of time this occurs for a document can be part of the retention policy.

At step 703, document instances that are flagged at step 702 are placed on a deletion queue (e.g., "to be deleted queue") and a retention policy manager (i.e., a software module designed to perform the function of managing retention policies) is notified of the pending deletions.

At step 704, the retention policy manager is operable to take one of three actions on a flagged instance: A) Nothing (i.e., proceed with the deletion as scheduled); B) Reset the retention period to a new value (e.g., due to a change in business rules or regulations); and C) Put the flagged instance into a suspended state (e.g., due to current business issues such as a pending litigation).

At step 705, instances that are changed or suspended at step 704 can be removed from the deletion queue (e.g., "to be deleted queue") and subjected to the normal processing going forward. Instances placed into a suspended state can remain in that state until the pending litigation or business conditions that placed it into the suspended state come to a conclusion. At that point, the retention policy is either reset to its original state or a new policy is applied. If the policy is reset to its original state and the deletion is now past due, it can be placed on the "to be deleted queue" on the next pass of the retention policy expiration scan. The new policy may or may not be in the future. If it was in the past, the same procedure as described above is followed, resulting in the deletion of the now expired document.

At step 706, each document in the deletion queue (e.g., "to be deleted queue") is processed and deleted on its due date (i.e., retention expiration date). When a document is deleted, a specific instance of that document is deleted. Deletion means removal of all relevant metadata and references to that instance of the content from the system. If other instances of that document (which may or may not include the original document) still exist under different custodians and/or retention policies, no further action is required. If the instance being deleted is the last instance of the document, then all remaining references, pointers and content components will be deleted from the system.

FIG. 8 is a diagrammatic representation of an exemplary application of a retention policy to stored documents according to one embodiment of the invention. According to one aspect of the invention, the above-described processes can be performed in three phases, as illustrated in FIG. 8. Prior to Phase 1, pre-processing steps can be performed to extract data from a plurality of data sources as described above with reference to FIG. 1, according to one embodiment of the invention. During the pre-processing stage, data extracted from data sources can be loaded into a database with metadata recording various attributes and properties of the data being loaded (e.g., dates, custodians, etc.). In one embodiment, each individual instance in the database is maintained with links to its metadata and custodian.

According to one embodiment of the invention, some or all of the following steps can be performed during Phase 1:
1. Explode nested documents, files, or data containers (e.g., directories, folders, etc.) in a system (e.g., system 100) into components until no or little nesting is present (steps 301-302).
2. Extract whatever textual content available from each item (step 303). If textual content is not readily available, additional processing may be utilized to facilitate the extraction of textual content. For example, a voice recording, which could be an attachment to an email message, may be first converted into text using a known voice-to-text (VTT) engine.
3. Link extracted text with its source document (step 304). Following the example of an email (source document) with a voice recording attachment (a component of the source document), textual content extracted from the voice recording is linked back to the email message.
4. Perform a content categorization utilizing a context analysis engine (optional) and associate one or more business categories with each source document (steps 501-504). In one embodiment, the content categorization can be optional if it is already a function of the underlying computer system.

According to one embodiment of the invention, some or all of the following steps can be performed during Phase 2:

1. Identify unique custodians in the system. In one embodiment, this can be done by running custodian assignment 400.
2. Identify business categories in the system. These can be business categories (e.g., positions, titles, job functions, etc.) from Phase 1. The amount of categories is not limited by any number and may be dependent on the size of the business in which the system represents. In some cases, a business can have hundreds if not thousands of categories.
3. Analyze and consolidate the categories in terms of retention policies. The consolidation, which can be optional, ensures that the least number of relevant categories are identified.
4. Gather retention policies that apply to the documents in the system (step 601).
5. Identify one or more algorithms that can allow cross-matching custodians, business categories, and retention policies (see FIG. 9). Such algorithms can be developed in conjunction with step 601. A retention policy can be a function of time and can depend on the role, position, or business function that a custodian held at the time the document was created and retained, and/or depend on the content or the category of the content of the document to which it refers. Thus, each algorithm may comprise a logical sequence of a finite number of steps for associating a custodian or a group of custodians and one or more business categories of a document to one or more particular retention policies.
6. Save and codify the identified algorithms in a form that can be applied to de-duplicated documents in the system.

Figure 9:
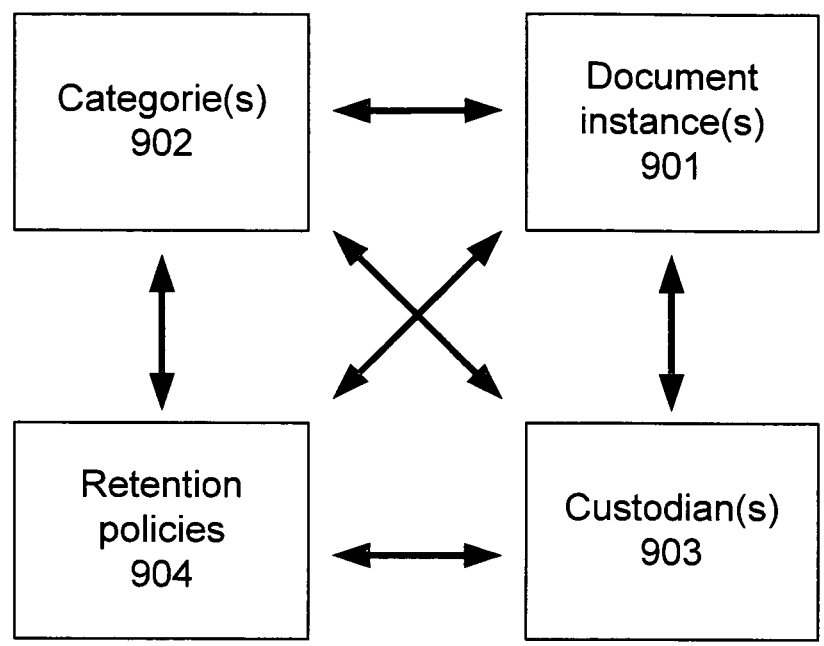
FIG. 9 is a block diagram schematically illustrating the cross-matching association between document instances, categories, custodians, and retention policies in a computing system, according to one embodiment of the invention.

According to one embodiment of the invention, some or all of the following steps can be performed during Phase 3:

1. Run the codified algorithms (i.e., computer-executable instructions) to associate one or more retention policies with each document (steps 602-603), each policy specifying a retention period. For example, one algorithm may specify that there is no retention period for documents associated with a particular custodian and/or a particular category. In the example of broker-customer communication described above, one algorithm may specify that if a document's custodian has a job function of a broker, then that document is associated with a retention policy that applies to brokers. FIG. 9 shows a block diagram 900 schematically illustrating the cross-matching association between document instances 901, categories 902 (e.g., a business function of a custodian), custodians 903 (e.g., creator, owner, user-defined, general, etc.), and retention policies 904.
2. An instance may have multiple retention policies associated with it if it has multiple categories, multiple custodians, or both, associated therewith. As an example, suppose that a user John created a document and another user Bob moved the document and saved it on a backup storage medium. In a de-duplicated database, John may be assigned as the custodian because he is the creator of the document and Bob may also be assigned as the custodian of the same document because he is the last owner of the document. John and Bob may have different business functions which can have different retention policies associated therewith. In cases where multiple retention policies may be applied to the same instance in compliance with different business rules, laws, regulations, and the like, one algorithm may specify which retention policy prevails. Further, one or more algorithms may be applied to a document instance.
3. In the event that an instance can be associated with multiple retention policies, all are recorded. In one embodiment, the retention period is set to the one that expires the furthest in the future (step 604). In the above example, a first retention policy associated with the document that John had created may specify a retention period of 3 years due to John's job function as a broker. However, another retention policy may specify a retention period of 7 years on all documents that Bob saved on the backup storage medium for tax reasons. In this case, the retention period would be set to 7 years. As another simplified example, suppose that Bob made a copy of the original document that John had created. In this case, when loading data into a de-duplicated database, two instances of the same document may be created in which John may be assigned as the custodian of one instance and Bob may be assigned as the custodian of the other instance. Embodiments of the invention disclosed herein can operate to establish different retention periods for the instance associated with John and the instance associated with Bob based on the context of each instance (e.g., who created/owned the document, why it was created/retained, and for how long, etc.) and monitor the differing retention periods accordingly. In embodiments of the invention, each instance in a business that the system represents can be associated with one or more retention policies based on the role, position, or job function of its custodian, or group of custodians, and the categories of the document content.
4. In one embodiment, once retention policies are set, the retention expiration process may be run to monitor retention periods on a continuous basis. For example, it may be run on a daily basis to detect if any instance of any document has expired or is due to expire within a specified window of time.
5. Instances that are due for deletion are placed onto a deletion queue for review. Instances placed on the queue are checked to determine whether they are subject to any current (i.e., pending) litigation or any legal proceedings that might affect the retention period. In one embodiment, this review process can involve an authorized user marking each instance placed on the queue (e.g., checking off options displayed to the user via an appropriate user interface). In one embodiment, this review process can be automated. In one embodiment, each instance can be marked for deletion, modification, or suspension. For example, if an instance placed on the queue may be subject to a litigation proceeding, it is marked as being in a suspended state (i.e., the expiration date is suspended) and the instance is removed from the deletion queue. When the litigation is complete, the retention policies are re-evaluated. If all retention policies have expired, the instance is placed on the deletion queue. If not, it is left in the system. If the instance is not subject to litigation, it may be marked for deletion. In some cases, the retention period of an instance placed on the queue may be adjusted or otherwise modified as the external (e.g., laws) and/or internal (e.g., corporate) retention policies change. For example, a new regulation may subject all instances in the system related to a particular business category, including those instances that might already be placed on the deletion queue, to a longer retention period. In this case, those instances are removed from the deletion queue and their retention periods are modified in accordance with the new regulation. The corresponding retention policy is updated to comply with the new regulation.

It should be understood that, while a data processing system may apply retention policies on documents dynamically as part of its document management process (i.e., on-the-fly), a data storage system generally processes historical documents for storage "after the fact" (i.e., after they have served their intended purpose). These historical documents (e.g., a collection of random documents retrieved from backup media) may not have sufficient contextual information to establish proper retention policies. Lacking contextual information, a conventional data storage system typically cannot properly establish and monitor retention policies on historical documents. The inability for a business to monitor and enforce retention policies on its historical documents can impede compliance to applicable data/document/content retention laws and regulations. Embodiments of the invention described above can add context to retention policy management for data storage systems. In particular, embodiments of the invention can identify custodian(s) and business topic(s) for each document instance loaded into an SIS database. These custodian(s) and business topic(s) can provide proper contextual information on the document's content (e.g., who created/held the document, the role/business function of the creator/owner at the time the document was created/retained, and what is the document about, etc.). This contextual information on historical content can be particularly useful in establishing and maintaining retention policies in compliance with external as well as internal rules and regulations.

Although the present invention has been described and illustrated in detail, it should be understood that the embodiments and drawings are not meant to be limiting and should be regarded in an illustrative rather than a restrictive sense. As one of ordinary skill in the art can appreciate, various modifications and changes can be made to the embodiments and drawings disclosed herein without departing from the scope of the present invention. In addition, many alternatives to the examples disclosed herein are possible. All such modifications and alternatives are intended to be included within the scope of present invention. Accordingly, the scope of the invention should be determined by the following claims and their legal equivalents.

What is claimed is:

1. A method for setting and managing a retention periods for documents in a distributed computing system, said method comprising the steps of:
   loading compound documents into a database as individual items;
   extracting text from one or more of the individual items and linking the text to a source item;
   establishing a custodian for each document instance from the one or more documents;
   categorizing content within the one or more documents into one or more categories and associating the one or more documents with the one or more categories;
   assigning retention policies to the content based on the one or more categories, wherein the policies specify a retention period; and
   continuously monitoring retention policies according to assigned retention periods;
   utilizing algorithms to cross-match one or more retention policies with the each document instance based on the role of the custodian held at the time a document instance was created and retained and the category to which the document instance refers,
   in the event multiple retention policies apply for the each document instance, setting a principle retention period to the furthest in the future; and
   monitoring the principle retention period for said document instance by placing document instances that are expired or about to expire in a queue for deletion, modification, or suspension, and removing from the queue any document instance having a modified or suspended retention period and deleting any remaining document instance in the queue.

2. The method according to claim 1 wherein said category represents at least one of the following: a business function, a job function, a time period, a regulation, and a legal proceeding status.

3. The method according to claim 1, further comprising:
   identifying one or more algorithms for programmatically associating said document instance in said distributed computing system with said retention policies; and
   codifying said one or more algorithms that are utilized.

4. The method according to claim 1, further comprising:
   processing at least the compound document from a plurality of documents into components, wherein said compound document includes said document instance.

5. The method according to claim 4, wherein the step of categorizing content within a document comprises the steps of:
   analyzing content of said components; and
   in response to said analyzing, determining said category with which said compound document is to be associated.

6. The method according to claim 1, wherein establishing said each document instance with said custodian further comprises the steps of:
   associating said document instance with said custodian in response to at least one of the following: authorship, ownership, and user-defined criteria of said document instance; and
   if no custodian is associated with said document, associating said document instance with a general custodian.

7. The method according to claim 6, wherein said custodian is associated in said computing system with a business function.

8. A distributed computing system, comprising:
   a plurality of data sources storing a plurality of documents in said distributed computing system, wherein said plurality of data sources include backup storage media;
   a database system configured to extract said plurality of documents from said plurality of data sources and de-duplicate said plurality of documents into document instances; and
   at least one computer-readable medium carrying computer-executable program instructions comprising:
   code for associating a document instance in said computing system with at least one category in said computing system, and with at least one custodian, wherein said category has an associated first retention policy that specifies a first retention period therefore, and wherein said custodian has an associated second retention policy that specifies a second retention period therefore;
   code for in response to said category and said custodian associated with said document instance, associating said document instance with said first and second retention policies;
   code for: setting a principle retention period for said document instance that has the longest retention policy and designating a policy that has the longest retention policy as the principle policy and designating all other associated policies as secondary policies for the document instance; and
   code for placing document instances that are expired or about to expire in a queue for deletion, modification, or suspension;
   code for removing from said queue any document instance having a modified or suspended retention period; and code for deleting any remaining document instance in said queue.

9. The distributed computing system of claim 8, wherein said computer-executable program instructions further comprise:
  code for associating said document instance with said custodian in response to at least one of the following: authorship, ownership, and user-defined criteria of said document instance; and
  code for: if no custodian is associated with said document instance, associating said document instance with a general custodian.

10. The computing system of claim 8, wherein said computer-executable program instructions further comprise:
  code for associating said custodian with said category.

11. The computing system of claim 8, wherein said computer-executable program instructions further comprise:
  code for monitoring said principle retention period for said document instance.

12. A method for setting a retention period for data in a distributed computing system comprising a processor and one or more associated databases with the data, the method comprising the steps of:
  loading a plurality of select data instances into one or more databases in a computing system;
  associating a select data instance in the computing system with at least one category in the computing system;
  assigning a code for associating the select data instance with at least one of a custodian and a group of custodians, where the custodian and the group of custodians is based on at least one of the following criteria: authorship, ownership, and user-defined criteria of the select data instance, wherein retention policies are associated with the custodian and the groups of custodians;
  associating the select data instance with one or more of the retention policies based on the custodian and the groups of custodians and the at least one category; and
  reviewing the select data instance and designating a policy with the longest retention period as the principle policy and all other associated policies as secondary policies for the select data instance;
  placing select data instances that are expired or about to expire in a queue for deletion, modification, or suspension;
  removing from the queue any select data instance having a modified or suspended retention period; and
  deleting any select data instance in the queue.

\* \* \* \* \*